March 4, 1958 M. L. ABEL 2,825,608
RETAINER FOR EXTERNAL BALL SURFACE OF A BEARING
Filed Sept. 13, 1954 2 Sheets-Sheet 1
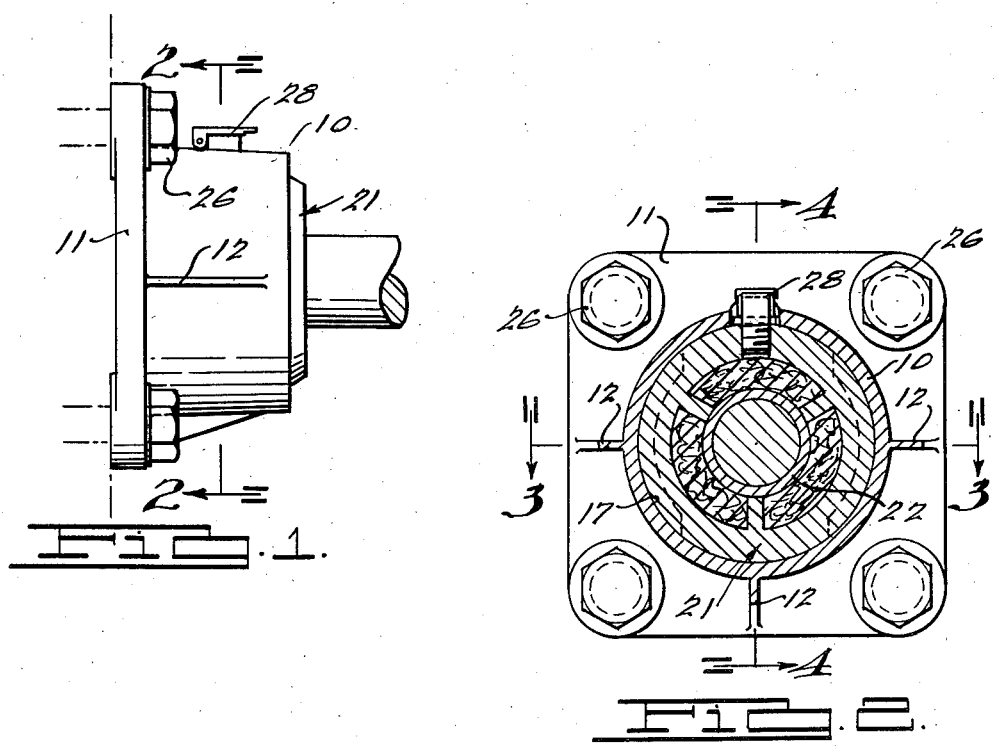
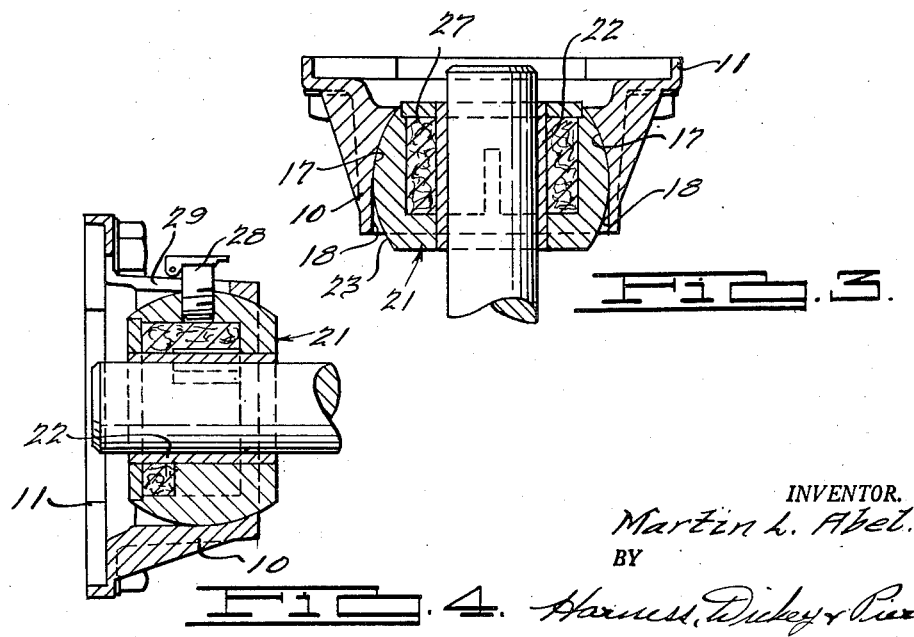
INVENTOR.
Martin L. Abel.
BY
Harness, Dickey & Pierce
ATTORNEYS.

March 4, 1958  M. L. ABEL  2,825,608
RETAINER FOR EXTERNAL BALL SURFACE OF A BEARING
Filed Sept. 13, 1954  2 Sheets-Sheet 2
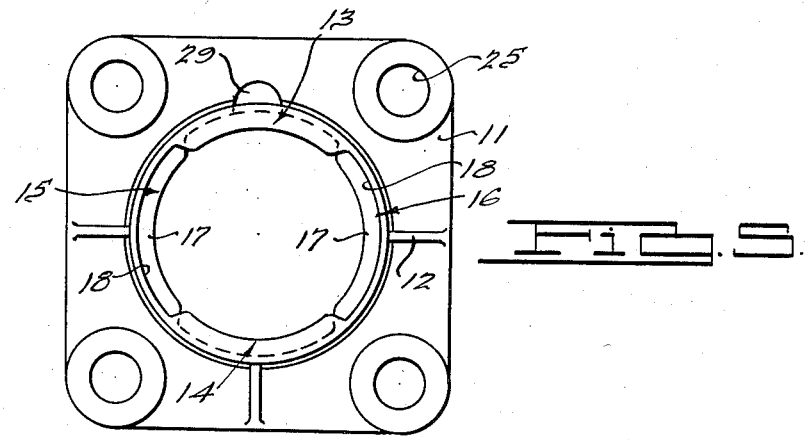
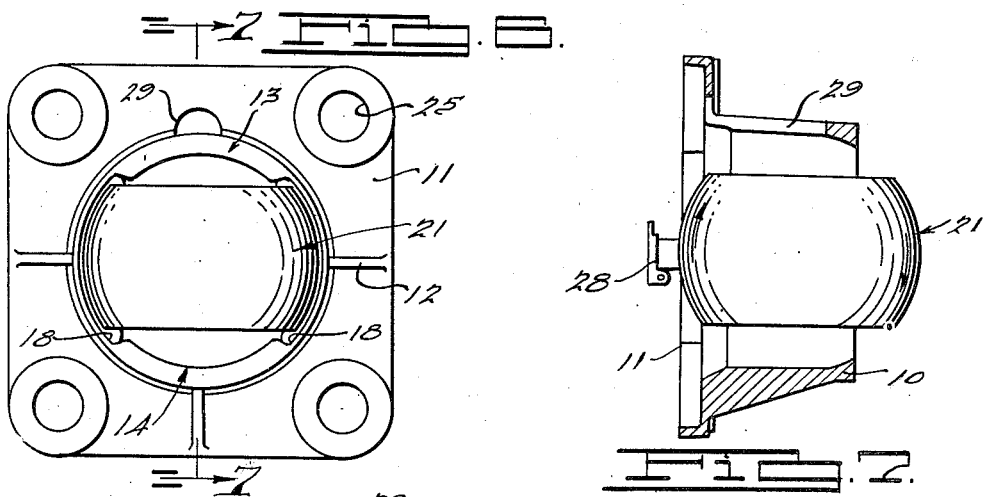
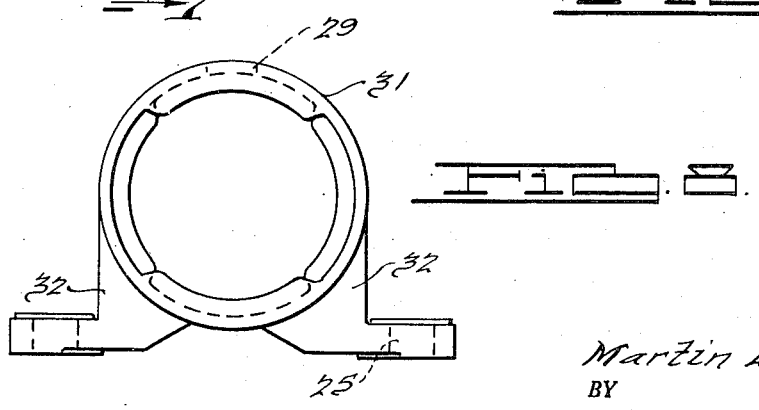

United States Patent Office 2,825,608
Patented Mar. 4, 1958

2,825,608

RETAINER FOR EXTERNAL BALL SURFACE OF A BEARING

Martin L. Abel, Detroit, Mich., assignor to Tann Corporation, Detroit, Mich., a corporation of Michigan Application September 13, 1954, Serial No. 455,456

10 Claims. (Cl. 308—72)

This invention relates to bearing housings, and particularly to a bearing housing for a ball section which provides an oscillatable support for a shaft and which is insertable and removable from the housing.

It has been the practice in the past to employ a bearing having a ball socket supported by a strap secured to a base in a manner to permit the ball to oscillate, thereby eliminating the necessity of accurately aligning the supporting bearings.

The present invention pertains to a ball and housing arrangement in which the spherical surface of the ball has mating spherical surfaces within the aperture of the housing but which are interrupted in a manner to permit the ball to be removed therefrom when the flat sides of the ball are aligned with the flat sides of the interruption of the spherical surface within the housing. The housing may have a base on one side thereof having apertures through which bolts extend to secure the housing to a wall, or feet may be provided on the housing by which the housing is attached to a support.

Accordingly, the main objects of the invention are: to provide a housing having a central opening and spaced spherical surfaces; to provide a housing having half sections of spherical surfaces, with opposite sections having flat areas which extend in an opposite direction from the flat areas of the sections disposed therebetween, with a flat-sided ball insertable in the flat sections and matable with the half spherical surfaces of all of the sections when rotated into engagement therewith; to provide a housing with a central aperture which receives a flat-sided ball, with the aperture having half spherical areas disposed in four sections, the opposite sections having flat portions which extend oppositely from the flat portions of the other pair of sections disposed therebetween so as to have the spherical portion of the ball mate with the half spherical sections of the housing when rotated in position of engagement therewith, and, in general, to provide a support for a flat-sided ball which may be inserted therein and rotated to have the spherical portion engage spherical portions of the housing, all of which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein:

Figure 1 is a view in elevation of a ball and socket bearing embodying features of the present invention;

Fig. 2 is a sectional view of the structure illustrated in Fig. 1, taken on the line 2—2 thereof;

Fig. 3 is a sectional view of the structure illustrated in Fig. 2, taken on the line 3—3 thereof;

Fig. 4 is a sectional view of the structure illustrated in Fig. 2, taken on the line 4—4 thereof;

Fig. 5 is a plan view of the housing portion of the structure illustrated in Fig. 2;

Fig. 6 is a view of the structure illustrated in Fig. 5, with the ball section bearing inserted therein before being rotated into operative position;

Fig. 7 is a sectional view of the structure illustrated in Fig. 6, taken on the line 7—7 thereof, and Fig. 8 is a view of structure, similar to that illustrated in Fig. 5, with supporting feet provided at the bottom of the housing.

Referring to Figs. 1 to 7, the ball socket bearing for supporting a shaft is clearly illustrated. A housing 10 has a supporting flange 11 at one side edge braced by ribs 12. The housing 10 is of cylindrical shape of predetermined internal form. Opposite sections 13, 14, 15 and 16 are of like form having half-spherical portions 17 which extend into straight, cylindrical portions 18. It will be noticed that the cylindrical portions 18 on the sections 15 and 16 extend outwardly from the supporting flange 11 and that the cylindrical portions 18 on the sections 13 and 14 extend in the opposite direction. The ball section 21 has a bearing 22 for supporting a shaft and a section of a spherical surface 23 which mates with the half-spherical portion 17 on the sections 13, 14, 15 and 16. The ball section may be inserted from the front or back within the housing through the opposite straight portions therein.

In Fig. 6, the ball section is illustrated as being inserted from the front, and after being inserted it is rotated 90°, as illustrated in Fig. 7, to have it move into operating position, as illustrated in Figs. 3 and 4. In this position, the spherical surface 23 of the ball section engages the half spherical surface portions 17 on all of the sections to thereby be securely retained in operating position and supported with sufficient surface engagement to eliminate any appreciable wear due to oscillation of the ball within the housing. It will be noted that the supporting flange 11 is provided with a plurality of apertures 25 by which the flange and housing are secured to a member by a plurality of bolts or screws 26. It will also be noted that a well 27 for a lubricant is provided in the ball section 21, the actual construction of which and the bearing which supports the shaft forming no specific part of the present invention, as this is disclosed in detail and claimed in Patent No. 2,761,746, issued September 4, 1956, to Martin L. Abel, and assigned to the assignee of the present invention.

It will also be noted that the ball section 21 may be provided with an oil filler cup 28 extending from the top of the housing when assembled thereto. The housing is provided with a slot 29 at the top which extends into the flange 11 sufficiently to permit the passage of the oil cup therethrough when the ball is rotated into operating position to project outside of the housing, as illustrated in Figs. 2 and 4 after assembly.

Referring to Fig. 8, a housing 31 is illustrated which is similar to the housing 10 of the structure illustrated in Figs. 1 to 7 inclusive and described above, with the exception that in the place of the supporting flange 11 at the rear edge of the housing 10, the housing 30 is provided with feet 32 at the bottom by which the housing is secured to a support by bolts which extend through the apertures 25 in the feet. Otherwise the housing is constructed exactly as that hereinabove described.

The particular shape of the housing permits the casting of both the ball section and housing, and the spherical surfaces of the housing retain the ball section therewithin when the shaft is mounted in the ball section. The four half-spherical portions within the housing have alternate portions facing in opposite directions so that the die section may be moved in opposite directions to release the housing after casting. After the ball section is disposed within the housing, it may be turned to have the spherical surface thereof mate with the half-spherical surfaces within the housing. After the shaft is inserted within the bearing of the ball section, the ball section cannot be moved from the housing as it is locked by the engaged half-spherical portions which are alternately disposed to face in opposite directions.

What is claimed is:

1. The combination with a cast housing and a ball section, the housing having an aperture the interior of which has two pairs of diametrically disposed wall portions, each wall portion having sections of partially spherical and partially cylindrical form scribed from the center of the aperture, opposite pairs of wall portions facing in opposite directions to have the diametrically disposed terminal ends of the cylindrical sections of the pairs at opposite ends of the aperture, and a ball section having a spherical portion mated with the spherical portion of each section, the width of the ball section being such as to pass from either side of the housing across the cylindrical sections of a pair of wall portions into position of engagement with the spherical sections of the pair of wall portions and to be swung into engagement with the spherical sections of the other pair of wall portions which are disposed between the first said pair of wall portions.

2. The combination with a cast housing and a ball section, the housing having an aperture the interior of which has two pairs of diametrically disposed wall portions, each wall portion having sections of partially spherical and partially cylindrical form scribed from the center of the aperture, opposite pairs of wall portions facing in opposite directions to have the diametrically disposed terminal ends of the cylindrical sections of the pairs at opposite ends of the aperture, and a ball section having a spherical portion mated with the spherical portion of each section, the width of the ball section being such as to pass from either side of the housing across the cylindrical sections of a pair of wall portions into position of engagement with the spherical sections of the pair of wall portions and to be swung into engagement with the spherical sections of the other pair of wall portions which are disposed between the first said pair of wall portions, said housing having on one end thereof a mounting flange by which it is secured to a support.

3. The combination with a cast housing and a ball section, the housing having an aperture the interior of which has two pairs of diametrically disposed wall portions, each wall portion having sections of partially spherical and partially cylindrical form scribed from the center of the aperture, opposite pairs of wall portions facing in opposite directions to have the diametrically disposed terminal ends of the cylindrical sections of the pairs at opposite ends of the aperture, a ball section having a spherical portion mated with the spherical portion of each section, the width of the ball section being such as to pass from either side of the housing across the cylindrical sections of a pair of wall portions into position of engagement with the spherical sections of the pair of wall portions and to be swung into engagement with the spherical sections of the other pair of wall portions which are disposed between the first said pair of wall portions, and feet provided on the outer peripheral wall of the housing by which the housing is mounted on a support.

4. The combination with a cast housing and a ball section, the housing having an aperture the interior of which has two pairs of diametrically disposed wall portions, each wall portion having sections of partially spherical and partially cylindrical form scribed from the center of the aperture, opposite pairs of wall portions facing in opposite directions to have the diametrically disposed terminal ends of the cylindrical sections of the pairs at opposite ends of the aperture, a ball section having a spherical portion mated with the spherical portion of each section, the width of the ball section being such as to pass from either side of the housing across the cylindrical sections of a pair of wall portions into position of engagement with the spherical sections of the pair of wall portions and to be swung into engagement with the spherical sections of the other pair of wall portions which are disposed between the first said pair of wall portions, said ball section having a central aperture and an annular recess for a lubricant, and a bearing in the aperture of said ball.

5. A support for a ball section comprising a cast housing having a central aperture the wall of which has two pairs of diametrically disposed wall portions, each wall portion having a portion of a cylinder and a portion of a sphere in continuation of each other struck from the center of the aperture, the portions of a cylinder at one end of one pair of the wall portions extending in the opposite direction from the portions of a cylinder at the end of the opposite pair of wall portions, and a ball within the wall portions disposed therein from either side of the housing.

6. A support for a ball section comprising a cast housing having a central aperture the wall of which has two pairs of diametrically disposed wall portions, each wall portion having a portion of a cylinder and a portion of a sphere in continuation of each other scribed from the center of the aperture, the portions of a cylinder at one end of one pair of the wall portions extending in the opposite direction from the portions of a cylinder at the end of the opposite pair of wall portions, a ball within the wall portions disposed therein from either side of the housing, and means in said housing by which it is secured to a support.

7. A support for a ball section comprising a cast housing having a central aperture the wall of which has two pairs of diametrically disposed wall portions, each wall portion having a portion of a cylinder and a portion of a sphere in continuation of each other scribed from the center of the aperture, the portions of a cylinder at one end of one pair of the wall portions extending in the opposite direction from the portions of a cylinder at the end of the opposite pair of wall portions, a ball within the wall portions disposed therein from either side of the housing, and means in said housing by which it is secured to a support, said means being flanged at one side of said housing.

8. A support for a ball section comprising a cast housing having a central aperture the wall of which has two pairs of diametrically disposed wall portions, each wall portion having a portion of a cylinder and a portion of a sphere in continuation of each other scribed from the center of the aperture, the portions of a cylinder at one end of one pair of the wall portions extending in the opposite direction from the portions of a cylinder at the end of the opposite pair of wall portions, a ball within the wall portions disposed therein from either side of the housing, and means in said housing by which it is secured to a support, said means extending from the outer surface of said housing at the bottom thereof.

9. The combination with a cast housing and ball section, the housing having a central aperture the wall of which has two pairs of diametrically disposed wall portions, each wall portion having a portion of a cylinder and a portion of a sphere in continuation of each other scribed from the center of the aperture, the portions of a cylinder at one end of one pair of the wall portions extending in the opposite direction from the portions of a cylinder at the end of the opposite pair of wall portions, said housing having a slot, and an oil cup on said ball section received by said slot when the ball section is revolved within the housing.

10. The combination with a cast housing and a ball section, the housing having an aperture the interior of which has two pairs of diametrically disposed wall portions, each wall portion having sections of partially spherical and partially cylindrical form scribed from the center of the aperture, opposite pairs of wall portions facing in opposite directions to have the diametrically disposed terminal ends of the cylindrical sections of the pairs at opposite ends of the aperture, and a ball section having a spherical portion mated with the spherical portion of each section, the width of the ball section being such as to pass from either side of the housing across the cylindrical sections of a pair of wall portions into position of engagement with the spherical sections of the pair of wall portions and to be swung into engagement with the spherical sections of the other pair of wall portions which are disposed between the first said pair of wall portions, said housing having on one end thereof a mounting flange by which it is secured to a support, a slot in said housing extending axially from a point spaced from the other end of said housing through said mounting flange, said slot extending through said flange at a point within one of said cylindrical portions adjacent said mounting flange, and an oil cup on said ball section received by said slot when the ball section is revolved within the housing.

References Cited in the file of this patent

UNITED STATES PATENTS

| | | |
|---|---|---|
| 2,016,021 | Palmgren | Oct. 1, 1935 |
| 2,290,213 | Shafer | July 21, 1942 |
| 2,309,281 | Steele | Jan. 26, 1943 |
| 2,352,351 | Thornhill | June 27, 1944 |
| 2,639,952 | Whiteley | May 26, 1953 |

FOREIGN PATENTS

| | | |
|---|---|---|
| 75,115 | Austria | July 15, 1917 |